United States Patent [19]

Cain et al.

[11] Patent Number: 5,324,533
[45] Date of Patent: Jun. 28, 1994

[54] CHOCOLATE COMPOSITIONS

[75] Inventors: Frederick W. Cain, Voorburg; Adrian D. Hughes, 's-Gravenhage, both of Netherlands; Geoffrey Talbot, Kempston, Great Britain

[73] Assignee: Van Den Bergh Foods Co., division of Conopco Inc., Lisle, Ill.

[21] Appl. No.: 907,361

[22] Filed: Jul. 1, 1992

[30] Foreign Application Priority Data

Jul. 3, 1991 [EP] European Pat. Off. ........ 91306026.5

[51] Int. Cl.$^5$ ................................. A23G 1/00
[52] U.S. Cl. ................................. 426/607; 426/610; 426/660
[58] Field of Search ................ 426/607, 660, 610

[56] References Cited

U.S. PATENT DOCUMENTS

| | | |
|---|---|---|
| 2,975,063 | 3/1961 | Paul et al. . |
| 2,979,407 | 4/1961 | Duck . |
| 3,012,890 | 12/1961 | Dutton ................. 426/607 |
| 3,491,677 | 1/1970 | Bracco . |
| 4,157,405 | 6/1979 | Yasuda ................. 426/607 |
| 4,199,611 | 4/1980 | Toyoshima ............ 426/607 |
| 4,208,445 | 6/1980 | Cottier et al. . |
| 4,219,584 | 8/1980 | Mori ................... 426/607 |
| 4,234,618 | 11/1980 | Jasko ................... 426/607 |
| 4,268,534 | 5/1981 | Kawada ................ 426/607 |
| 4,276,322 | 6/1981 | Padley et al. . |
| 4,283,436 | 8/1981 | Soeters ................. 426/660 |
| 4,348,423 | 9/1982 | Pairaud ................. 426/607 |
| 4,486,457 | 12/1984 | Schijf et al. . |
| 4,533,561 | 8/1985 | Ward . |
| 4,594,259 | 6/1986 | Baker .................. 426/660 |
| 4,613,514 | 9/1986 | Maruzeni .............. 426/607 |
| 4,705,692 | 11/1987 | Tanaka ................. 426/607 |
| 4,726,959 | 2/1988 | Momura ................ 426/610 |
| 4,839,192 | 6/1989 | Sagi .................... 426/607 |
| 4,861,611 | 8/1989 | Baba et al. . |
| 4,873,109 | 10/1989 | Tanaka ................. 426/607 |
| 4,877,636 | 10/1989 | Koyano ................. 426/610 |
| 4,882,192 | 11/1989 | Maeda .................. 426/607 |
| 4,888,196 | 12/1989 | Ehrman ................. 426/607 |
| 4,902,527 | 2/1990 | Galenkamp ............ 426/607 |
| 4,910,037 | 3/1990 | Sagi .................... 426/607 |
| 5,023,106 | 6/1991 | Ehrman ................. 426/610 |
| 5,066,510 | 11/1991 | Ehrman ................. 426/613 |
| 5,135,769 | 8/1992 | Itagaki ................. 426/610 |

FOREIGN PATENT DOCUMENTS

| | | |
|---|---|---|
| 1234683 | 9/1983 | Australia . |
| 0196210 | 1/1986 | Japan ................... 426/607 |
| 0285422 | 10/1988 | Japan ................... 426/607 |
| 0354025 | 2/1990 | Japan ................... 426/607 |
| 1437781 | 4/1976 | United Kingdom . |
| 2168071 | 6/1986 | United Kingdom . |

OTHER PUBLICATIONS

Patton 1976 Biomedical Aspects of Lactation Pergamon Press Oxford pp. 78–84.
Gunstone, F. E., et al. "The Lipid Handbook", (1986) p. 113.
Derwent Abstract of SU 665,885.
Abstract of JP 46026824.

Primary Examiner—Carolyn Paden
Attorney, Agent, or Firm—Cushman, Darby & Cushman

[57] ABSTRACT

Incorporation of at least 0.5 wt. % of a hardstock rich in $(H_2M+HM_2)$-fat into chocolate compositions results in chocolates that display improved bloom characteristics. H=saturated fatty acid with $\geq C_{16}$; M=saturated fatty acid with $C_8$–$C_{14}$, in particular $C_{12}$–$C_{14}$.

13 Claims, No Drawings

CHOCOLATE COMPOSITIONS

BACKGROUND OF THE INVENTION

Chocolate compositions containing such conventional ingredients as cocoa powder, cocoa butter, cocoa butter equivalents, sugar, emulsifier need to be tempered because of the presence of polymorphic fats such as POP, POSt and/or StOSt (P=palmitic acid, St=stearic acid and O=oleic acid). Still, it was very difficult to avoid bloom formation, i.e. a polymorphic transformation of the crystal lattice. Therefore, many attempts have been made to find additives that could prevent bloom formation in chocolate compositions. Examples of such additives are butterfat, fully hardened, high-erucic rapeseed and BOB (B=behenic, O=oleic).

However, very often the results obtainable with these additives are not satisfactory. Therefore, we have conducted a study in order to find out whether it was possible to find a new, more effective additive.

PRIOR ART

From U.S. Pat. No. 2,979,407 stabilizing ingredients for solid chocolate materials or chocolate-coated products are known that are included in the chocolate in amounts of 0.5-5 wt. %. The stabilizing ingredients consist of triglycerides of lauric, myristic and palmitic acid, preferably in molar ratios of 2.0:1.2:2.0. Minor amounts of other fatty acids do not change the basic character of the ingredients. The ingredients are used to stabilize the colour of chocolate upon storage. Because of the very strict requirements set to the fatty acid components of the triglycerides that may be used, these products have never been applied commercially.

From U.S. Pat. No. 3,491,677 it is further known that bloom formation can be inhibited by utilization of fatty compositions that are mixtures of natural interesterified triglycerides comprising short-chain fatty acids and long-chain fatty acids while the iodine value (=I.V.) of the compounds is 30–55 and the melting point is low. As a consequence of the above-mentioned requirements, only a limited range of triglycerides could be applied while the low melting point may create problems as regards the properties of the chocolate composition.

From EP 390,408 triglyceride compositions are known that contain high levels (at least 85%) of combined MLM and MML (M=saturated fatty acid $C_8$–$C_{10}$; L=saturated fatty acid $C_{20}$–$C_{24}$) and low levels (i.e. at most 10 wt. %) of triglycerides LLM and LML (combined). These fats should always contain $C_8$ and $C_{10}$ fatty acid residues (35–60 wt. %) in a ratio of 1:4 to 4:1, while also 35–60 wt. % of behenic acid should be present. Minor amounts of $C_{12}$–$C_{18}$ fatty acids can be present in the fats.

The fat phase comprising the above-mentioned triglycerides should contain less than 20 wt. % of cocoa butter (i.e. less than 15 wt. % of SUS; S=saturated $C_{16}$/$C_{18}$; U=oleic). The triglycerides are applied in order to reduce the caloric value of compositions normally containing cocoa butter by replacing cocoa butter by these mixed triglycerides.

SUMMARY OF THE INVENTION

We have now found that the drawback of the prior art can be overcome by the use of a particular hardstock fat in the chocolate composition. Therefore, our invention is concerned with chocolate compositions consisting of at least the conventional chocolate ingredients and at least 25 wt. % of a fat, including optionally hardstock components, which compositions are characterized by the presence of an amount of ($H_2M$+$HM_2$)-fat that contain at least 5 wt. %, preferably at least 20 wt. %, of stearic acid and that display preferably an iodine value of less than 20, preferably less than 5, of at least 0.5 wt. %, while the SOS content of the composition is at least 15 wt. %, in which:

H means saturated fatty acid with $\geq C_{16}$, preferably $C_{16}$–$C_{18}$;

M means saturated fatty acid with $C_8$–$C_{14}$, preferably $C_{12}$–$C_{14}$;

S means saturated fatty acid with $C_{16}$/$C_{18}$;

O means oleic acid.

The above-mentioned requirement of at least 0.5% ($H_2M$+$HM_2$) in the composition can be fulfilled by the addition of the lauric fat (=$HM_2$+$H_2M$ fat) to the chocolate composition. The chocolate composition can then be used for the preparation of such chocolate products as chocolate bars. For this purpose, the chocolate is tempered before it is moulded into bars.

In this way, products are obtained that have an increased resistance to blooming.

The best results are obtained when the ($H_2M$+HM2) content is at least 0.6 wt. %, preferably 0.8–2.0 wt. %.

DETAILED DESCRIPTION OF THE INVENTION

As hard fat component containing ($H_2M$+$HM_2$), interesterified mixtures of vegetable oils high in triglycerides with fatty acid residues with at least 16 C atoms and triglycerides rich in lauric and/or myristic acid residues can be used advantageously. Examples of such fat mixtures are mentioned in, e.g., our Australian patent application 12346/83, Ser. No. 549,465.

In particular, interesterified mixtures of hardened palm oil and hardened palmkernel oil, such as an interesterified mixture of PO-58 and PK-39, are very suitable. Fractions of these products can also be used. For instance, the olein fraction of the wet fractionation of such an interesterified fat mixture also gives very satisfactory results.

Very suitable lauric hardstock fats display melting points of at least 35° C., while the weight ratio $C_{12}/C_{14}$ in these fats is preferably more than 2.

The hardstock can be used in any kind of chocolate composition. So, plain chocolate and milk chocolate can both be used. The chocolate can also contain other ingredients, such as flavour, fruit components etc.

The invention also concerns a process for the production of the chocolate composition. The products are made in a conventional way, whereby the ($H_2M$+$HM_2$)-containing hardstock is incorporated into the composition, whereupon the compositions thus obtained are tempered and the tempered compositions are used for the preparation of such confectionery products as chocolate bars.

Furthermore, our invention is concerned with the use of the lauric fat compositions in order to achieve retardation of bloom of chocolate compositions.

The invention will now be illustrated by the following non-limiting Examples.

EXAMPLES

I. Chocolate compositions were made with the composition as mentioned in Table 1.

TABLE 1

|  | A | B |
|---|---|---|
| Cocoa powder (10/12) | 190 | 190 |
| Cocoa butter | 260 | 260 |
| Sugar | 500 | 500 |
| Cocoa butter equivalent | 50 | 30 |
| Hardstock | — | 20 |
| Emulsifier | 4 | 4 |

So, the hardstock is present in an amount of 2% in composition B.

Hardstock is an interesterified mixture of hardened palm oil (melting point 58) and palm kernel oil (melting point 39).

The carbon number analysis of the hardstock is: $C_{30}$-$C_{38}$: 4.1%; $C_{40}$: 4.1%; $C_{42}$: 9.8%; $C_{44}$: 12.5%; $C_{46}$: 21.4%; $C_{48}$: 23.0%; $C_{50}$: 10.6%; $C_{52}$: 9.0%; $C_{54}$: 5.3%;

The FAME of the hardstock was as follows: $C_{12}$: 20.1%; $C_{14}$: 8.1%; $C_{16}$: 23.7%; $C_{18}$: 44.3%; $C_{18:1}$: 0.4%; $C_{18:2}$: 0.4% and others 3.1%.

Its I.V. was 1.0.

The chocolate compositions were tempered and moulded into bars. The bars were stored in a cabinet, which was set to cycle between 15° C. and 25° C. at 12-hourly intervals. The bars were assessed for bloom at weekly intervals, with the following results:

| Composition | Appearance of Bloom |
|---|---|
| A | After 1 week |
| B | Not within 13 weeks |

II. In the following Examples the following hardstock fats were applied:

| Carbon number | A | B | C |
|---|---|---|---|
| $C_{30}$-$C_{38}$ | 17.9 | 6.3 | 43.4 |
| $C_{40}$ | 10.1 | 5.7 | 13.6 |
| $C_{42}$ | 15.5 | 12.9 | 17.6 |
| $C_{44}$ | 11.8 | 13.7 | 9.8 |
| $C_{46}$ | 14.1 | 20.3 | 7.6 |
| $C_{48}$ | 13.8 | 21.3 | 5.0 |
| $C_{50}$ | 6.3 | 9.3 | 1.9 |
| $C_{52}$ | 5.7 | 7.3 | 1.1 |
| $C_{54}$ | 3.2 | 3.0 | — |

II.1 Bars were made from standard dark Callebaut chocolate. Different amounts of different fats were added to the composition according to the recipe below:

The chocolate bars were slab-tempered and then the bars were moulded and stored at 23° C.

The following chocolate compositions were used:
1. 100% Callebaut chocolate
2. 98% Callebaut chocolate+2% hardstock B
3. 95% Callebaut chocolate+5% shea stearin
4. 98% Callebaut chocolate+2% palm kernel fat
5. 99% Callebaut chocolate+1% hardstock C The bars were evaluated after 6 months at 23° C.:
Bloom score 5=perfect; below 3=unacceptable

| Sample | $H_2M$ + $M_2H$ level on product | Bloom score |
|---|---|---|
| 1 | trace | 2 |
| 2 | 1.5% | 5 |
| 3 | trace | 3 |
| 4 | 0.3 | 2 |

-continued

| Sample | $H_2M$ + $M_2H$ level on product | Bloom score |
|---|---|---|
| 5 | 0.55 | 5 |

II.2 Bars were made in a similar way as under II.1. However, the following chocolate compositions were applied:
1. 95% Callebaut chocolate+5% cocoa butter equivalent (abt. 70% SOS);
2. 95% Callebaut chocolate+2% fat B+3% of the same CBE;
3. 95% Callebaut chocolate+4% fat C+1% of the same CBE; 4. 95% Callebaut chocolate+4% fat A+1% of the same CBE.

The bars were evaluated after 6 months' storage at 25° C.

| Sample | $H_2M$ + $M_2H$ level on product | Bloom score |
|---|---|---|
| 1 | trace | 1 |
| 2 | 1.5 | 5 |
| 3 | 2.6 | 5 |
| 4 | 2.1 | 5 |

III. A batch of chocolate powder was made with the following composition:
Icing sugar: 55%
Chocolate powder N11N: 20%
Cocoa butter: 25%
Lecithin: 0.4%

The chocolate powder was blended, using a conch with fats according to the following recipe:
1. 95% chocolate powder+5% of a CBE (palm mid/shea stearin);
2. 95% chocolate powder+2% fat B+3% of the same CBE.

The chocolate was tempered in a Leatherhead temper kettle in the usual manner.

Bars were moulded and stored at 20/32° C. (12 hours' cycling).

The bars were evaluated after 1 month's storage.

| Sample | ($H_2M$ + $M_2H$)-level on product | Bloom score |
|---|---|---|
| 1 | trace | 1 |
| 2 | 1.5 | 4/5 |

IV. The chocolate powder of Example III was used. Bars were made in the same way, using, however, the following recipes:
1. 95% chocolate powder+5% cocoa butter equivalent (abt. 70% SOS)
2. 95% chocolate powder+3% of the same CBE+2% fat B.

Evaluation after 4 months' storage at 25° C. showed:

| Sample | ($H_2M$ + $M_2H$)-level on product | Bloom score |
|---|---|---|
| 1 | trace | 2/3 |
| 2 | 1.5 | 5 |

V: Example III was repeated, using, however, the following recipes:
1. 95% chocolate powder+5% cocoa butter;
2. 95% chocolate powder+2% cocoa butter+3% butter fat;

3. 95% chocolate powder + 3% cocoa butter + 2% fat B.

Evaluation after 2 months' storage at 20/32° C. (12 hours' cycling) showed:

| Sample | ($H_2M$ + $M_2H$)-level on product | Bloom score |
| --- | --- | --- |
| 1 | trace | 1 |
| 2 | 0.4 | 1 |
| 3 | 1.5 | 5 |

We claim:

1. Chocolate containing composition consisting of at least the conventional chocolate ingredients and at least 25 wt. % of a fat, which composition comprises at least 0.5 wt. % of ($H_2M+HM_2$)-fat wherein the ($H_2M+HM_2$)-fat contains at least 5 wt. % of stearic acid residues, and wherein the ($H_2M+HM_2$)-fat displays an iodine value of less than 20, and wherein the SOS content of the composition is at least 15 wt. % in which:

H means saturated fatty acid with at least 16 carbon atoms;

M means saturated fatty acid with 12-14 carbon atoms;

S means saturated fatty acid with 16-18 carbon atoms; and

O means oleic acid, said composition having an increased resistance to bloom when tempered and moulded.

2. Chocolate compositions according to claim 1, wherein the ($H_2M+HM_2$)-content is at least 0.6 wt. %.

3. Chocolate compositions according to claim 1, wherein the ($H_2M+HM_2$)-containing hardstock is an interesterified mixture of a vegetable oil high in triglycerides with fatty acid residues having at least 16 C atoms and a vegetable triglyceride rich in acid residues selected from the group consisting of lauric acid residues, myristic acid residues and mixtures thereof.

4. Chocolate compositions according to claim 3, wherein the hardstock is an interesterified mixture of hardened palm oil and hardened palm kernel oil.

5. Chocolate compositions according to claim 4, wherein the hardstock is an interesterified mixture of hardened palm oil having a melting point of 58° C. and hardened palm kernel having melting point of 39° C. or fractions thereof.

6. Chocolate composition according to claim 1, wherein the hardstock has a melting point of at least 35° C. and a weight ratio $C_{12}:C_{14}$ of more than 2.

7. Chocolate compositions according to claim 1, wherein the chocolate composition is made of plain chocolate or milk chocolate.

8. Chocolate compositions having the composition as mentioned in claim 1, wherein the compositions are tempered.

9. Chocolate bars comprising at least partly the tempered compositions of claim 8.

10. The compositions of claim 1 wherein the compositions contain at least 20 wt. % of stearic acid.

11. The compositions of claim 1 wherein H means a saturated fatty acid having 16-18 carbon atoms.

12. The compositions of claim 1 wherein M means a saturated fatty acid with 12-14 carbon atoms.

13. The compositions of claim 1 wherein the ($H_2M+HM_2$) content is 0.8-2.0 wt. %.

* * * * *